US006942941B2

(12) United States Patent
Blunk et al.

(10) Patent No.: US 6,942,941 B2
(45) Date of Patent: Sep. 13, 2005

(54) ADHESIVE BONDS FOR METALIC BIPOLAR PLATES

(75) Inventors: Richard H. Blunk, Macomb, MI (US); Mahmoud H. Abd Elhamid, Warren, MI (US); Daniel J. Lisi, Eastpointe, MI (US); Youssef M. Mikhail, Sterling Heights, MI (US); Michael K. Budinski, Pittsford, MI (US)

(73) Assignee: General Motors Corporation, Detroit, MI (US)

( * ) Notice: Subject to any disclaimer, the term of this patent is extended or adjusted under 35 U.S.C. 154(b) by 41 days.

(21) Appl. No.: 10/635,123

(22) Filed: Aug. 6, 2003

(65) Prior Publication Data

US 2005/0031933 A1 Feb. 10, 2005

(51) Int. Cl.[7] .............................. H01M 8/02; H01M 2/08
(52) U.S. Cl. .......................... 429/36; 429/26; 29/623.4; 427/115; 428/457
(58) Field of Search ................................ 429/26, 34–39, 429/210; 29/623.4, 623; 427/115; 428/457

(56) References Cited

U.S. PATENT DOCUMENTS

| 5,578,388 | A | 11/1996 | Faita et al. |
| 5,624,769 | A | 4/1997 | Li et al. |
| 5,776,624 | A | 7/1998 | Neutzler |
| 5,863,671 | A | 1/1999 | Spear, Jr. et al. |
| 6,099,984 | A | 8/2000 | Rock |
| 6,103,413 | A | 8/2000 | Hinton et al. |
| 6,218,089 | B1 | 4/2001 | Pierrat |
| 6,372,376 | B1 | 4/2002 | Fronk et al. |
| 2003/0096151 | A1 | 5/2003 | Blunk et al. |

FOREIGN PATENT DOCUMENTS

EP          1009051        6/2000
EP          1035608        9/2000

OTHER PUBLICATIONS

Petrie, Edward M. Handbook of Adhesives and Sealants, Chapter 7: Primers and Adhesion Promoters, McGraw–Hill, 2000.*

Michael C. Kimble, Alan S. Woodman, and Everett B. Anderson, Physical Sciences, Inc., Andover, MA, Characterization of Corrosion–Protective Methods for Electrically Conductive Coatings on Aluminum, American Electroplaters and Surface Finishers Society, AESF SUR/FIN '99 Proceedings, Jun. 21–24, 1999, pp. 1–12.

Molecular Structure, Mechanical Behavior and Adhesion Performance of PSAs, Dr. Albrecht Zosel, BASF AG Ludwigshafen, Germany http://www.Adhesivesmag.com/CDA/ArticleInformation/converstory/BNPCoverStoryItem/0, 2103,11474,00.html, posted Sep. 27, 2000.

* cited by examiner

Primary Examiner—Jonathan Crepeau
(74) Attorney, Agent, or Firm—Harness, Dickey Pierce, P.L.C.

(57) ABSTRACT

The present invention relates to an electrically conductive element (e.g. bipolar plate) for a fuel cell which has an improved adhesive bond. The conductive element generally comprises a first and a second conductive sheet, each having a surface that confront one another. The surfaces that confront one another are overlaid with an electrically conductive primer coating providing corrosion protection and low contact resistance to said first and said second sheets respectively in regions where the first and second sheets contact one another. The first and said second coated surfaces are joined to one another by an electrically conductive adhesive which provides adhesion of said first and said second coated surfaces of said sheets at the contact region. Further, the present invention contemplates methods to form such an improved bond in an electrically conductive element.

36 Claims, 6 Drawing Sheets

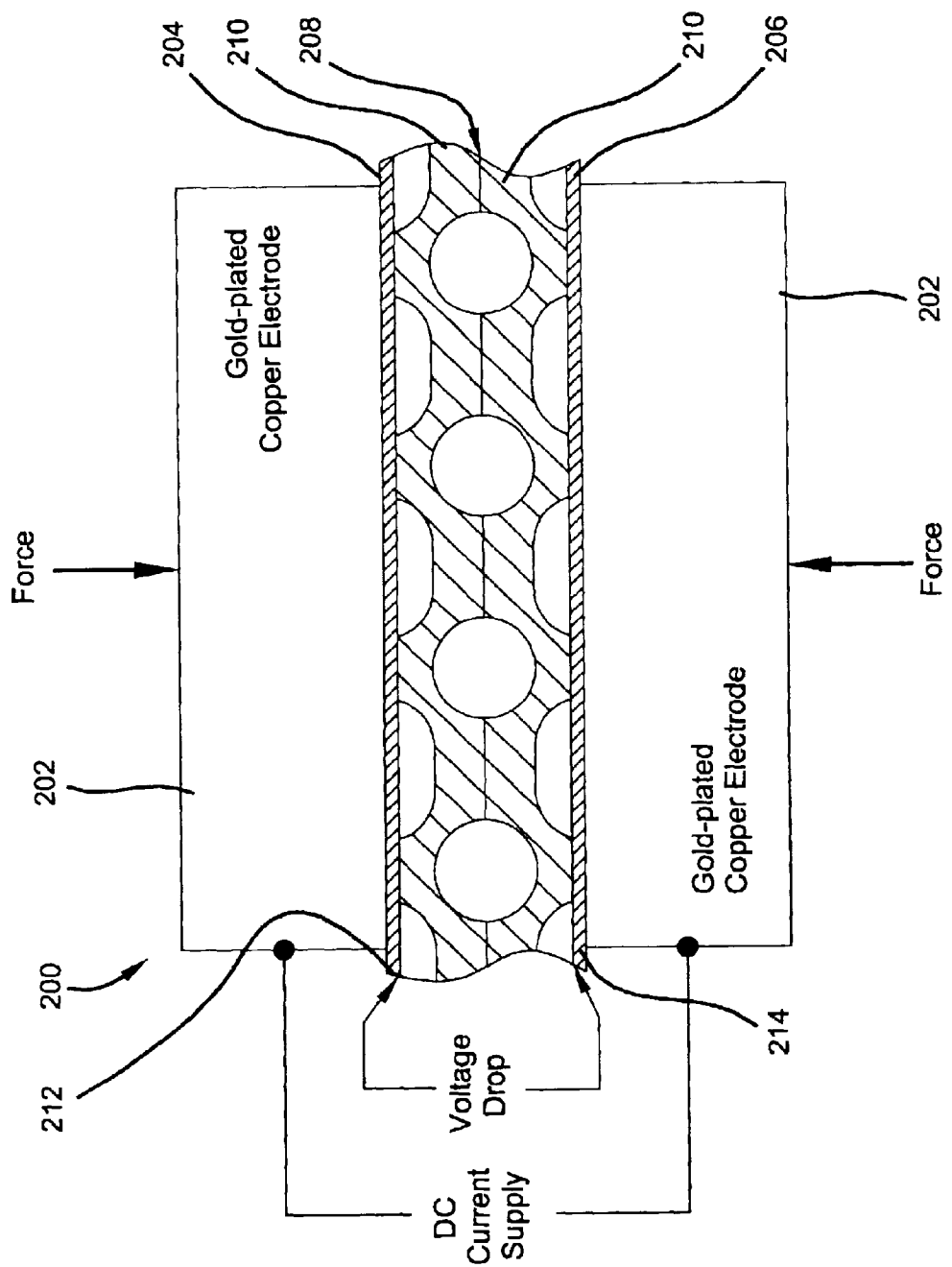

ADHESIVE BONDS FOR METALIC BIPOLAR PLATES

FIELD OF THE INVENTION

The present invention relates to PEM fuel cells and, more particularly, to metallic separator plates and methods for making the same.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, having very finely divided catalytic particles supported on the internal and external surfaces of the carbon particles, and proton conductive material intermingled with the catalytic and carbon particles.

The membrane-electrode-assembly is sandwiched between a pair of electrically conductive contact elements which serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar or separator plate or septum. The separator or bipolar plate has two working faces, one confronting the anode of one cell and the other confronting the cathode on the next adjacent cell in the stack, and each bipolar plate electrically conducts current between the adjacent cells. Contact elements at the ends of the stack are referred to as end, terminal, or collector plates. These terminal collectors contact a conductive element sandwiched between the terminal bipolar plate and the terminal collector plate. The conductive elements serve as an electrically conductive separator element between two adjacent cells, and typically has reactant gas flow fields on both external faces thereof, conduct electrical current between the anode of one cell and the cathode of the next adjacent cell in the stack, and have internal passages therein through which coolant flows to remove heat from the stack.

The PEM fuel cell environment is highly corrosive, and accordingly, the bipolar plates and the materials used to assemble them must be both corrosion resistant and electrically conductive. Bipolar plates are generally fabricated from two separate conductive sheets, and may be constructed of electrically conductive metal or composite materials. These individual plates must be joined together at a joint, which must withstand the harsh conditions of the fuel cell, while providing high electrical conductivity to reduce voltage losses, low weight to improve gravimetric efficiency, and durability for long-term operational efficiency. There remains the challenge to optimize the bonding of electrically conductive elements comprising independent components in a fuel cell to promote efficiency as cost-effectively as possible.

SUMMARY OF THE INVENTION

The present invention provides a conductive element for a fuel cell comprising a first conductive sheet having a first surface that confronts a second surface of a second conductive sheet. The first and the second surfaces are overlaid with an electrically conductive primer coating providing corrosion protection and a target contact or interfacial resistance across the first and the second sheets, respectively. The first and the second coated surfaces are joined to one another at one or more contact regions by an electrically conductive adhesive which together with the primer provides the target bondline resistance. The term bondline resistance refers to the interfacial contact resistance plus bulk adhesive resistance. The bondline resistance of the invention is considerably lower than a comparative bondline resistance of the adhesive without the primer (high contact resistance) at a given compression pressure. Further, the contact and, in turn, the bondline resistance for the present invention is maintained for a time greater than that achieved with the aforesaid comparative bondline resistance.

In alternate preferred embodiments of the present invention, an electrically conductive contact element for a PEM fuel cell is contemplated. The element comprises a first sheet having a first contact surface overlaid with an electrically conductive adhesive primer coating and a second sheet having a second contact surface overlaid with the electrically conductive adhesive primer coating. One or more bond regions join the first contact surface and the second contact surface. The bond regions have an electrical resistance of less than 5 mohm-cm$^2$ after 500 hours of operation in fuel cell operating conditions.

In another alternate preferred embodiment of the present invention, an electrically conductive contact element comprises a first sheet having a first contact surface overlaid with an electrically conductive adhesive primer coating and a second sheet having a second contact surface overlaid with the electrically conductive adhesive primer coating. An electrically conductive adhesive is disposed between the first contact surface and the second contact surface in electrical contact regions. The electrically conductive adhesive primer coating comprises graphite, carbon black, and a polymeric binder and the total amount of graphite and carbon combined are present in the matrix at less than about 10% by weight.

The present invention also contemplates a fuel cell stack comprising a plurality of fuel cells and an electrically conductive element sandwiched between an anode and cathode in a fuel cell. The electrically conductive element in the fuel cell stack comprises a first electrically conductive sheet having an anode confronting surface and a first heat exchange surface and a second electrically conductive sheet having a cathode confronting surface and a second heat exchange surface, where the first and second heat exchange surfaces are coated with a primer coating comprising a first plurality of electrically conductive particles dispersed in a corrosion resistant polymer. The first and second heat exchange surfaces confront each other so as to define therebetween a coolant flow passage adapted to receive a liquid coolant and being electrically coupled to one another at a plurality of sites via an electrically conductive adhesive. The electrically and thermally conductive adhesive comprises a second plurality of conductive particles dispersed in a polymer having adhesive properties. The primer coating and the electrically/thermally conductive adhesive together define an electrically/thermally conductive path between the first and second sheets, and an electrical/thermal resistance across the electrically conductive path is sufficiently low such that current generated by the anode and cathode is conducted therefrom at a rate sufficient to prevent overheating of the coolant and the membrane electrode assembly (MEA).

In alternate preferred embodiments of the present invention, a method of increasing bond durability of an electrically conductive element in a fuel cell is provided. The method comprises coating a first surface of a first sheet and a second surface of a second sheet with an electrically conductive adhesive primer. An electrically conductive adhesive is disposed between the first and second coated surfaces, which joins the first and the second coated surfaces together. The adhesive is selected for sustained sealing engagement with the adhesive primer applied on the first and the second surfaces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is an exemplary testing apparatus used to measure the contact resistance of a sample.

DETAILED DESCRIPTION OF THE PREFERRED EMBODIMENTS

The following description of the preferred embodiment(s) is merely exemplary in nature and is in no way intended to limit the invention, its application, or uses. The present invention contemplates an electrically conductive element (e.g. bipolar plate) for a fuel cell which has an improved adhesive bond. The conductive element generally comprises a first and a second conductive sheet, each having a surface that confront one another. The surfaces that confront one another are overlaid with an electrically conductive primer coating providing corrosion protection and low contact resistance to the first and the second sheets respectively in regions where the first and second sheets contact one another. The first and second coated surfaces are joined to one another by an electrically conductive adhesive which provides adhesion of the first and second coated surfaces of the sheets at the contact region. Further, the present invention contemplates methods to form such an improved bond in an electrically conductive element. First, to better understand the present invention, a description of an exemplary fuel cell and stack are provided herein.

Figure 1:
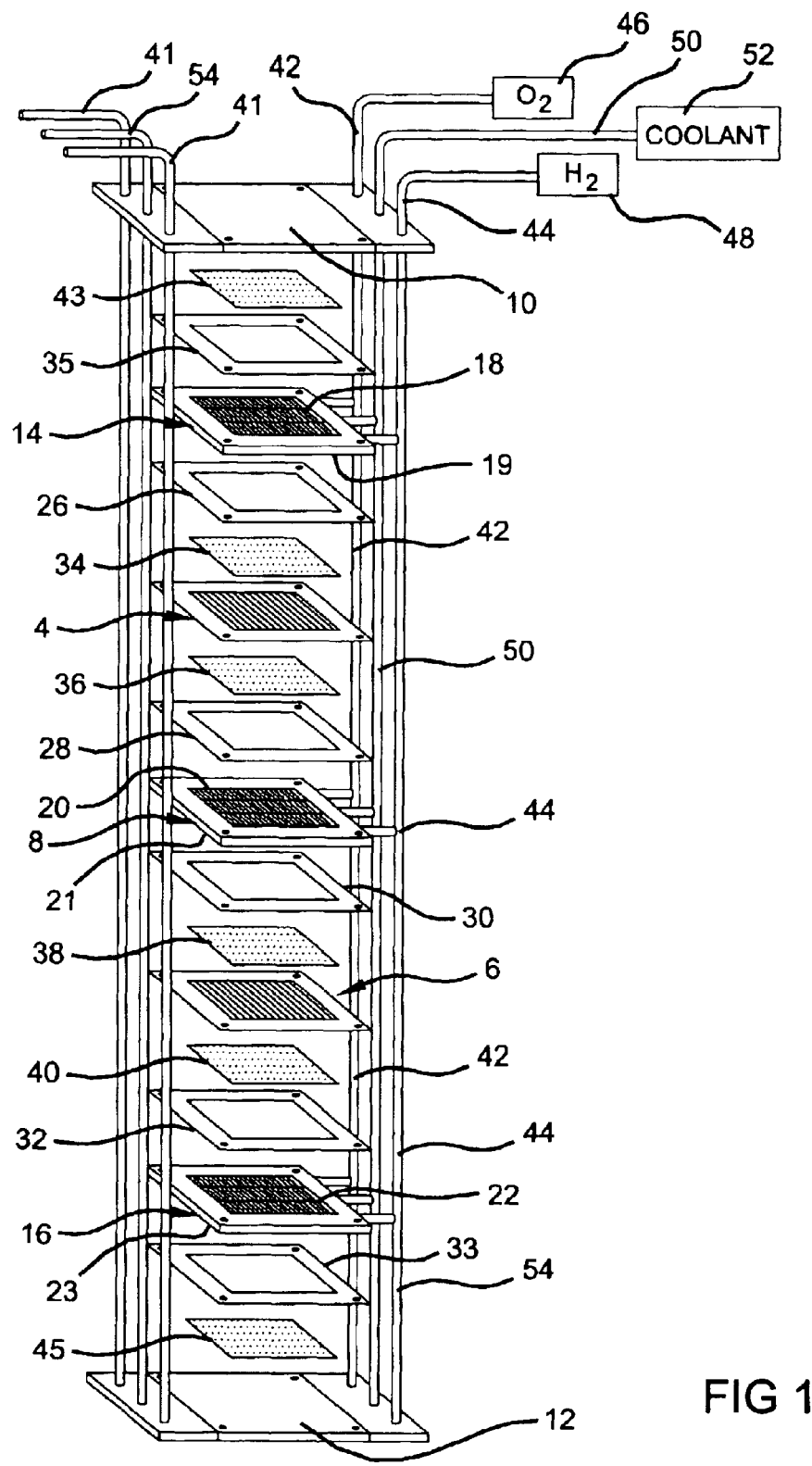
FIG. 1 is a schematic illustration of two cells in a liquid-cooled PEM fuel cell stack.

To gain a better understanding of the present invention, an exemplary fuel cell where the present invention may be employed is shown in FIG. 1, which depicts two individual proton exchange membrane (PEM) fuel cells connected to form a stack having a pair of membrane-electrode-assemblies (MEAs) 4, 6 separated from each other by an electrically conductive, liquid-cooled, bipolar separator plate conductive element 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so-called "bipolar" plate. As described herein, the fuel cell stack is described as having conductive bipolar plates, however the present invention is equally applicable to stacks having only a single fuel cell.

The MEAs 4,6 and bipolar plate 8 are stacked together between stainless steel clamping terminal plates 10,12 and end contact fluid distribution elements 14,16. The end fluid distribution elements 14, 16, as well as both working faces or sides 20,21 of the bipolar plate 8, contain a plurality of lands adjacent to grooves or channels on the active faces 18, 19, 20, 21, 22, and 23 for distributing fuel and oxidant gases (i.e., $H_2$ and $O_2$) to the MEAs 4,6. Nonconductive gaskets or seals 26, 28, 30, 32, 33, and 35 provide seals and electrical insulation between the several components of the fuel cell stack. Gas-permeable conductive diffusion media 34, 36, 38, and 40 press up against the electrode faces of the MEAs 4,6. Additional layers of conductive media 43, 45 are placed between the end contact fluid distribution elements 14,16 and the terminal collector plates 10,12 to provide a conductive pathway therebetween when the stack is compressed during normal operating conditions. The end contact fluid distribution elements 14,16 press up against the diffusion media 34,43 and 40,45 respectively.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing 41 for both the $H_2$ and $O_2$/air sides of the MEAs is also provided. Additional plumbing 50 is provided for circulating coolant from a storage area 52 through the bipolar plate 8 and end plates 14, 16 and out the exit plumbing 54.

Figure 2:
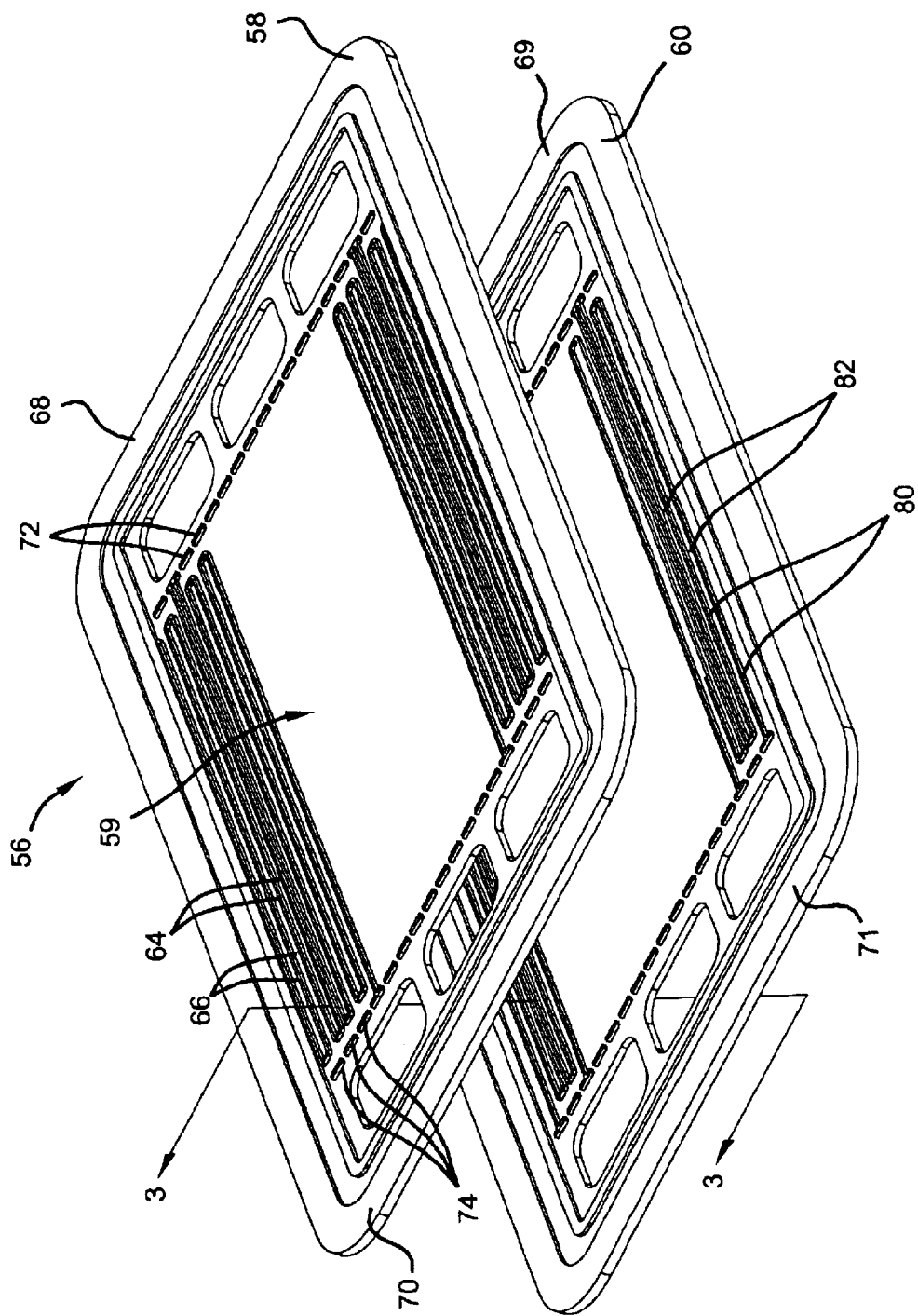
FIG. 2 is an exemplary electrically conductive separator element showing a preferred embodiment of the present invention.

The present invention relates to conductive elements in a fuel cell, such as the liquid-cooled, bipolar plate 56 shown in FIG. 2, which separates adjacent cells of a PEM fuel cell stack, conducts electric current between adjacent cells of the stack, and cools the stack. The bipolar plate 56 comprises a first exterior metal sheet 58 and a second exterior metal sheet 60. The sheets 58,60 may be formed from a metal, a metal alloy, or a composite material, and are preferably electrically conductive. Suitable metals, metal alloys, and composite materials have sufficient durability and rigidity to function as sheets in a conductive element within a fuel cell. Additional design properties for consideration in selecting a material for the plate body include gas permeability, conductivity, density, thermal conductivity, corrosion resistance, pattern definition, thermal and pattern stability, machinability, cost and availability. Available metals and alloys include titanium, platinum, stainless steel, nickel based alloys, and combinations thereof. Composite materials may comprise graphite, graphite foil, conductive particles (e.g. graphite powders) in a polymer matrix, carbon fiber paper and polymer laminates, polymer plates with metal cores, conductively coated polymer plates, and combinations thereof.

The exterior metal sheets 58,60 are made as thin as possible (e.g., about 0.002–0.02 inches or 0.05–0.5 mm thick). The sheets 58,60 may be formed by any method known in the art, including machining, molding, cutting, carving, stamping, photo etching such as through a photolithographic mask, or any other suitable design and manufacturing process. It is contemplated that the sheets 102, 104 may comprise a laminate structure including a flat sheet and an additional sheet including a series of exterior fluid flow channels.

The external sheet 58 has a first working surface 59 on the outside thereof which confronts an anode of a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite papers (such as 36 or 38 in FIG. 1) which, in turn, press against the MEAs (such as 4 or 6 in FIG. 1, respectively). For drafting simplicity, FIG. 2 depicts only two arrays of lands 64 and grooves 66. In reality, the lands and grooves 64,66 will cover the entire external surfaces of the metal sheets 58, 60 that engage the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

Figure 3:
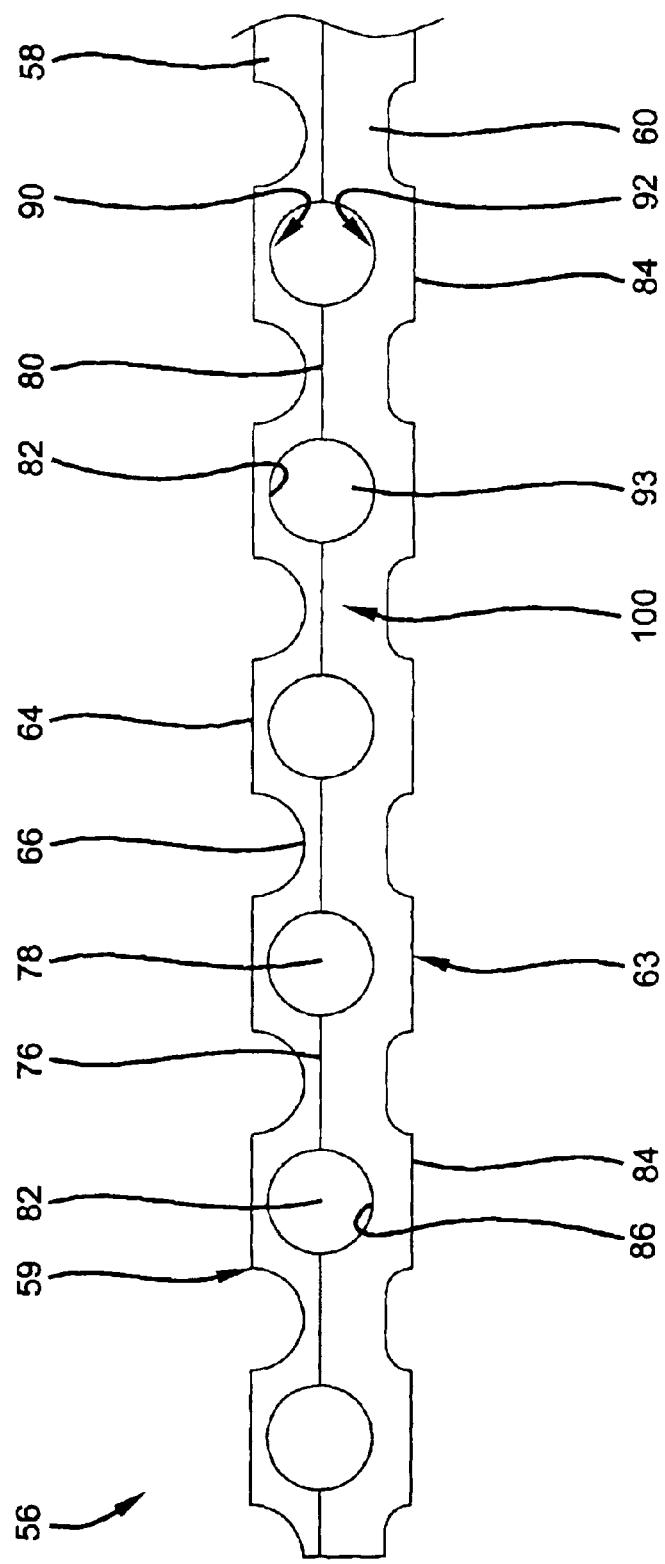
FIG. 3 is a cross-sectional view taken along line 3—3 of FIG. 2, showing a conductive element of a preferred embodiment of the present invention.

As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76. Alternatively, the sheet 58 could be flat and the flow field formed in a separate sheet of material. Sheet 60 is similar to sheet 58. In this regard, there is depicted a plurality of ridges 80 defining therebetween a plurality of channels 93 through which coolant flows from one side 69 of the bipolar plate to the other 71. The heat exchange (coolant side) surfaces 90,92 of the first and second sheets 58,60 confront each other so as to define therebetween the coolant flow passages 93 adapted to receive a liquid coolant, and are electrically coupled to each other at a plurality of joints, or contact regions 100. Like sheet 58 and as best shown in FIG. 3, the external side of the sheet 60 has a working surface 63 facing a cathode of another MEA having a plurality of lands 84 thereon defining a plurality of grooves 86 through which the reactant gases pass.

Coolant flows between the channels 93 formed by sheets 58,60 respectively, thereby breaking laminar boundary layers and affording turbulence which enhances heat exchange with inside surfaces 90, 92 of the exterior sheets 58, 60 respectively. As recognized by one of skill in the art, the current collectors of the present invention may vary in design from those described above, such as for example, in the configuration of flow fields, placement and number of fluid delivery manifolds, and the coolant circulation system, however, the function of conductance of electrical current through the surface and body of the current collector functions similarly between all designs. In preferred embodiments of the present invention, an electrically conductive path of good durability is formed across the contact regions 100. In circumstances where the electrical resistance across the contact regions 100 is too high, a significant amount of heat is generated at the contact regions 100, which is transferred to the coolant. It is preferred that the sustainable electrical resistance across the conductive path is low enough that it does not cause overheating of the coolant. Moreover, high electrical resistance across the conductive path results in voltage (power) losses in the stack.

Figure 4:
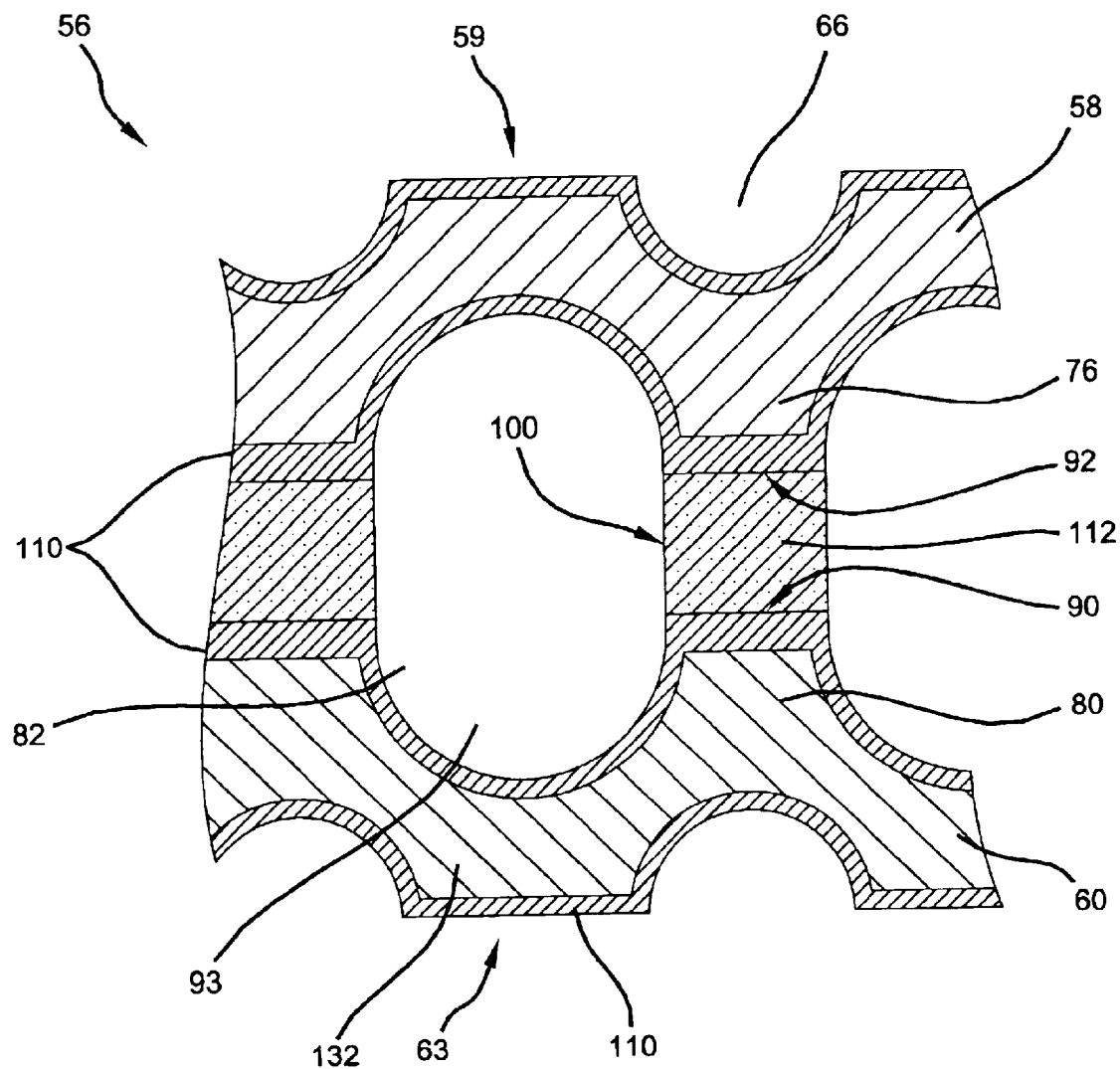
FIG. 4 is a magnified view of a contact region shown in FIG. 3.

FIG. 4 is a magnified view of a portion of FIG. 3 and shows the ridges 76 on the first sheet 58 and the ridges 80 on the second sheet 60 are coupled to one another in the contact region 100 to ensure the structural integrity of the separator element 56. The first metal sheet 58 is joined at the contact region 100 directly (i.e., without an intermediate spacer sheet) to the second metal sheet 60 via a plurality of conductive joints in discrete contact regions 100. The contact region 100 provides an electrically conductive path that is required for the bipolar plate element to function as a current collector. The contact region 100 is often referred to as the "bond" or "bond line".

Previous methods of attaching the first and second plates 58,60 at the contact region 100 have included metallic brazing and welding (in the case of metal sheets) or conductive adhesives (for both metallic and composite sheet materials). When using adhesives to couple the sheets 58,60 to one another, the electrical resistance taken across the bond line or contact region 100 has been within desirable ranges when measured shortly after fabrication. However, after long term use, there is a potential for bond degradation at the contact region 100. It is believed that the discrepancy in thermal coefficients between different materials, such as polymer adhesives and metal sheets, as well as long term exposure to the harsh environment of the fuel cell, may contribute and enhance bondline degradation. Bondline degradation may increase contact (bondline) resistance across the contact region 100, to impermissible levels after long-term operation (i.e. greater than 500 operational hours) due to physical separation along the junction of the metal sheets and adhesive.

Figure 5:
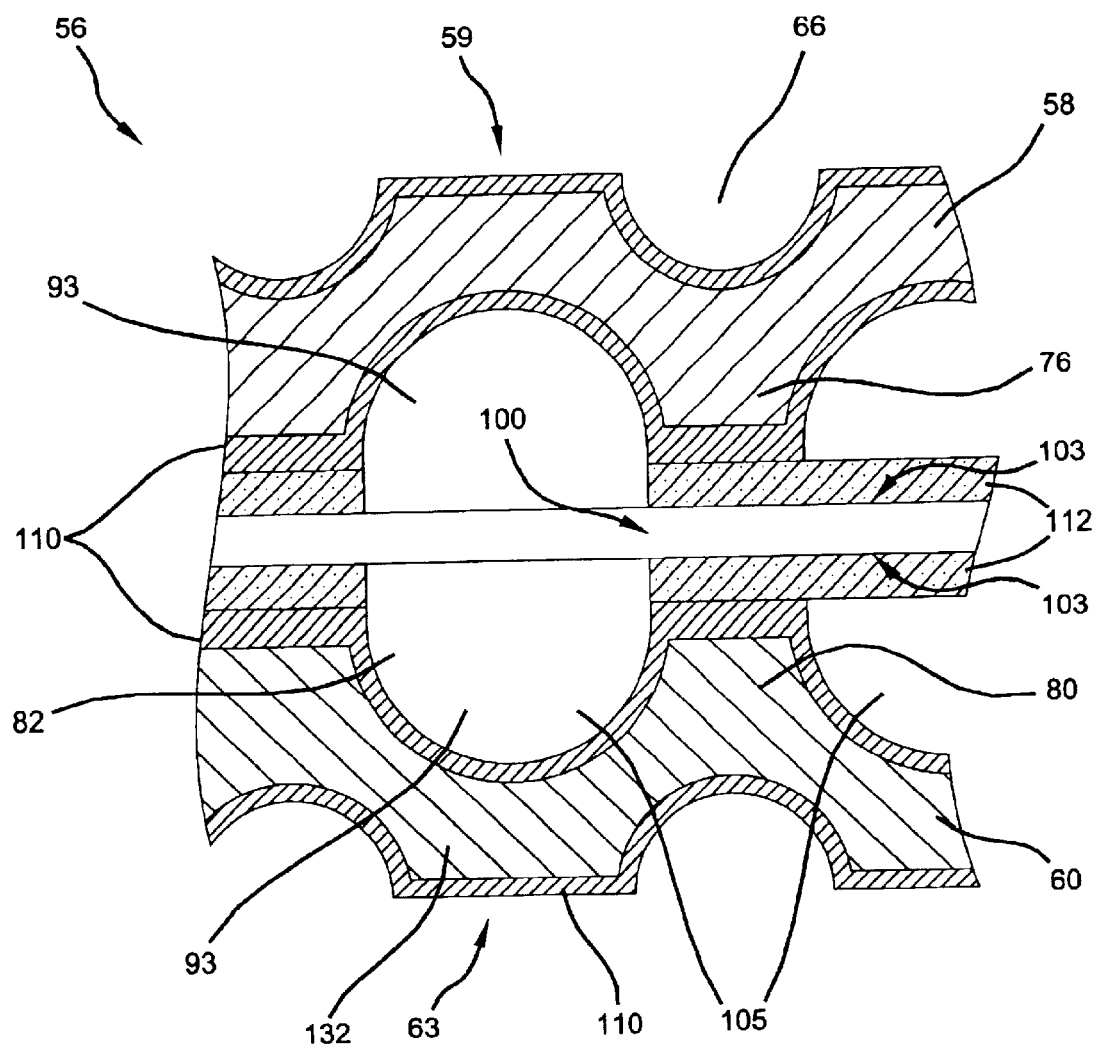
FIG. 5 is a magnified view of an alternate embodiment of a contact region of the present invention, where an intermediate separator plate is disposed between a first and a second sheet of the conductive element.

The present invention is also applicable to any electrically conductive elements that are joined to one another within the fuel cell. While the first and second sheets 58,60 may be adhered directly to each other in accordance with the present invention as shown in FIG. 4, in a bi-polar plate assembly 56, the first and second sheets 58,60 may alternatively be glued to a discrete intermediate, separator conductive sheet 101 (FIG. 5) that may partition the coolant flow passage 93. The intermediate separator sheet 101 may be perforated so as to permit coolant to move between the smaller coolant flow passages 93. In such an embodiment, the separator sheet 101 will be treated in accordance with the present invention by adhering the contact surfaces 103 of the separator sheet 101 to the respective first and second conductive sheets 58,60. The separator sheet 101 may be corrugated to provide a plurality of coolant channels 105 in the coolant flow passage 93, or may be a flat sheet joined to first and second outer sheets which each have a plurality of coolant flow channels formed therein, as for example by corrugating the outer sheets.

All mutually contacting regions 100 of the exterior sheets 58,60 (and interior separator sheet when used) are adhered together to insure that the coolant passage 93 is sealed, preferably in a sustained sealing engagement that is fluid tight against coolant leakage and to provide low resistance electrical conduction between adjacent cells. A sustained sealing engagement is one that preferably lasts greater than 500 operational hours, and most preferably greater than 6000 operational hours. A fluid tight seal is a seal formed at the contact regions 100 that prevents, or at least impedes, fluid and gas transport therethrough. The electrically conductive adhesive also serves as a conductive filler for filling any gaps between the sheets 58,60 resulting from irregularities in the sheets. The present invention is also applicable to the terminal conductive elements (e.g. 14,16 of FIG. 1) at the ends of the stack that provide cooling and current collection.

The present invention provides a conductive element within a fuel cell that has an electrically conductive adhesive primer 110 overlaying both the first sheet 58 and the second sheet 60 along the regions of their respective surfaces 90,92 that will confront one another at the contact region 100, as shown in FIG. 4. An electrically conductive adhesive 112 is disposed between the first and second surfaces 90,92 having primer 110 applied, such that the bond formed at the contact region 100 has enhanced long-term durability and sustainable contact (bondline) resistance beyond 500 hours of operation. As part of the present invention, it is preferred that all metal oxides are removed from the surfaces 90,92 of metal sheets at the sites 100 where the primer 110 is to be applied, and especially in the contact regions 100 to create as low resistance electrical connection as is possible between the sheets 58,60 through the adhesive primer 110 and the adhesive 112 of the bondline. Nonmetallic sheets (e.g., polymeric composites or graphite) do not require oxide removal, but may require sanding or removal of the insulating polymer-rich film at the sheet surface formed during molding.

The electrically conductive adhesive primer coating 110 in preferred embodiments of the present invention provides both corrosion resistance to the underlying sheets, high thermal conductivity, low electrical resistance, and compatibility with the adhesive polymer. The adhesive primer 110 comprises a matrix of a plurality of electrically conductive particles dispersed within a binder comprising a polymeric resin. The electrically conductive particles may comprise noble metals, including gold, platinum, silver, and palladium, as well as nickel, tin, graphite, carbon black, and mixtures thereof. The adhesive primer coating 110 may comprise between about 5% by weight and about 75%, by weight of conductive particles, depending on the relative conductivity of the respective conductive particles selected.

In preferred embodiments of the present invention, the conductive particles comprise graphite, carbon black, and a binder polymer presented in amounts yielding a desired total carbon content of the coating. In preferred embodiments, the total carbon is less than 75% by weight, and more specifically less than about 10% by weight total carbon. One example of a preferred adhesive binder composition can be found in U.S. patent application Ser. No. 10/292,407 filed on Nov. 11, 2002 to a common assignee as that of the present invention, and is herein incorporated by reference in its entirety. The amount of total carbon in the coating is primarily a result of the respective amounts of graphite and carbon black in the coating. In one embodiment, the coating comprises graphite and carbon black at a ratio of about 2:1, by weight. Referring specifically to the amount of graphite in the coating, in one embodiment, the coating may comprise between about 3.3% by weight and about 50%, by weight, graphite. Referring specifically to the amount of carbon black in the coating, the coating may comprise between about 1.7% by weight and about 20%, by weight, carbon black.

Various types of graphite are particularly preferred for use in the primer coating 110. The graphite may be selected from expanded graphite, graphite powder, graphite flakes. The graphite may be characterized by a particle size between about 5 $\mu$m and about 90 $\mu$m. The graphite may have a low bulk density, which is generally less than 1.6 g/cm$^3$, and more specifically, less than about 0.3 g/cm$^3$. The intrinsic density may range between about 1.4 g/cm$^3$ and about 2.2 g/cm$^3$. The graphite may have a relatively high purity and being substantially free of contaminants. The expanded graphite having any of the above described features for use in a coating according to the present invention may be produced by any suitable method. In one embodiment a suitable graphite material may be used that is available from Sigri Great Lakes under the tradename Sigriflex.

Additionally, various types of carbon black are suitable for use in the coating. By way of illustration and not by limitation, the carbon black may be selected from acetylene black, Ketjen™ black, Vulcan black, Regal™, furnace black, black pearl and combinations thereof. Carbon black may be characterized by a particle size between about 0.05 and about 0.2 $\mu$m. The carbon black generally contains few impurities.

In addition to the differing amounts of graphite and carbon black, the adhesive primer coating 110 may also include differing amounts of binder polymer. The amount of binder may vary depending upon the amount of conductive particles used in the coating. Generally, higher binder content is desired for enhanced adhesion, corrosion resistance, and application flow. In one embodiment, the adhesive primer coating 110 comprises between about 1% and 95% by weight of binder in the matrix, and more specifically about 90% by weight of the binder. Many types of binders are suitable for use in the coating. In one embodiment, the binder comprises a polymeric resin. Suitable polymeric resins include polyamide imide, polyimide, poly vinyl ester and combinations thereof. Suitable vehicles for the binders include, but not limited to, propylene glycol methyl ether acetate, N-methyl-2-pryrrlidone, xylene and combinations thereof.

A variety of different coating compositions are contemplated by the present invention. In one embodiment, the primer coating 110 is in the form of a gel. Specifically, in one preferred embodiment, the coating comprises about 6.7% by weight of expanded graphite, having a particle size from about 5 $\mu$m to about 90 $\mu$m, about 3.3% by weight of acetylene black, having a particle size of about 0.05 $\mu$m to about 0.2 $\mu$m, and about 90% by weight of polyamide imide binder.

Many types of binders are suitable for use in the adhesive primer coating 110. In one preferred embodiment, the binder comprises a polymeric resin. Suitable polymeric resins include polyamide imide, polyimide, poly vinyl ester and combinations thereof. Suitable vehicles for the binders include, but are not limited to, propylene glycol methyl ether acetate, N-methyl-2-pryrrlidone, xylene and combinations thereof.

Furthermore, the coating 110 may be manufactured such that it comprises less than 200 ppm of metal contaminants. In one embodiment, the coating exhibits a contact resistance between about 5 to about 60 mΩ-cm$^2$ (milli-ohms square centimeter) at a contact pressure of between 25 and about 200 psi (170 to 1400 KPa). In most preferred embodiments, the primer coating 110 exhibits a contact resistance less than about 10 mΩ-cm$^2$ at a compression pressure greater than or equal to about 200 psi (1400 KPa). It is preferred that the total resistance of the primer coating 110 is less than about 20 mΩ-cm$^2$ at compression pressures exceeding about 200 psi (1400 kPa), to enhance the conductivity across the sheets 58,60 and through the contact region 100 or bondline.

In preferred embodiments where graphite and carbon black are used as the conductive particles in the primer coating 110 matrix, a synergism exists between the expanded graphite and carbon black. The contact resistance remains low, less than 20 mΩ-cm2, at low total carbon content. The "synergism" refers to the combination of graphite and carbon black producing a lower contact resistance than when either the graphite or the carbon black are used alone at the same total carbon content. Thus, in preferred embodiments, the primer coating 110 comprises both graphite and carbon black, however other combinations of conductive particles with binder in the primer coating 110 matrix that exhibit a relatively low contact resistance are also suitable for the present invention.

The primer coating 110 for according to the present invention may be prepared to overlay or coat the sheets of the electrically conductive element by conventional means known of one of skill in the art. An example of such preparation includes milling the conductive particles and the binder together. The milling preferably occurs for an amount of time between about 1 to about 20 hours, and preferably for about two hours or less. The milling conditions, such as the amount of time the primer coating 110 is milled, can vary depending upon the materials used in the coating and the desired properties of the coating 110.

After preparation, the adhesive primer coating 110 is then applied to the surface 90 of the first conductive sheet 58 that will be coupled with the other surface 92 of the opposite conductive sheet 60. To effect good adherence of the adhesive primer coating 110 in accordance with the present invention, with certain conductive sheet compositions (e.g. metals) it is preferred that the surface 90,92 of the conductive sheet 58,60 is cleaned (e.g., by abrading and/or chemically etching) to remove all surface oxides and other contaminants from the regions where adhesive primer coating 110 is to be applied. Thus, in the cases of a conductive sheet 58,60 fabricated from a metal, the surface 90,92 can be chemically cleaned by (1) degreasing with methyl-ethyl-ketone, and (2) pickling for 2 to 5 minutes in a solution comprising (a) 40% nitric acid, (b) 2% to 5% hydrofluoric acid, (c) 4 grams/gallon of ammonium biflouride, and water. Alternatively, the surfaces 90,92 of the conductive sheets 58,60 may be physically cleaned by abrading the surfaces with 100 to 220 grit abrasive followed by cleaning and degreasing with acetone, or by cathodically cleaning the substrate in the presence of a metal cleaning electrolyte.

In the embodiment shown in FIG. 4, conductive adhesive primer 110 is applied to both the first coolant side contact surface 90 of the first sheet 58 and the second coolant side contact surface 92 of the second sheet 60, thus both of these surfaces 90,92 are cleaned prior to application of the coating 110. The conductive adhesive primer 110 may be used to coat the entire surfaces 90,92 of the conductive sheet 58,60 to provide corrosion protection therefore, or in alternate embodiments, may be applied to discrete regions (i.e. contact regions 100) that are electrical and physical contact points. The adhesive primer 110 may be applied by any suitable method such as laminating (such as by hot rolling), brushing, spraying, spreading (such as with a doctor blade), coil coating, silk screening, powder coating, and screen printing. In one embodiment, the adhesive primer coating 110 is sprayed onto the conductive sheet 58,60 to form multiple coats, which will form along the surface 90,92 of the conductive sheet 58,60 a conductive primer coating 110. In the case of adhesive primer 110 applied to the surface in discrete regions 100, where contact will occur with the adhesive 112, a mask having apertures formed therein can be applied over the surface 90,92 to permit application of the adhesive primer 110 in contact regions 100 only.

According to the present invention, the adhesive primer 110 overlaying the contact surface 90,92 of the conductive sheet 58,60 will be cured to achieve cross-linking of the polymer resin within the matrix. Such curing may be achieved in one embodiment by complete curing prior to contacting and assembling the adhesive primer 110 to the adhesive 112 itself. In alternate preferred embodiments, the polymeric resin may be two-stage cured, where a preliminary curing is achieved initially. After contact is established with the adhesive 112 (and the opposite conductive sheet have a coating of adhesive primer 110) the entire assembly having the partially cured adhesive primer 110 can be cured together (including the adhesive 112) to achieve the final stage of curing. Whether the curing of the adhesive primer 110 coating is performed prior to contact with the adhesive 112, or in a staged-curing method is dependent upon the properties of adhesive primer 110 binder resin and the adhesive 112 itself, as will be described in more detail below. One particular advantage to a two-stage curing process is that it is adaptable to high volume production processes, where the adhesive primer 110 can be applied in a coil coating process, partially cured, and then subsequently processed. The reactant flow fields (64, 66, 84, 86, for example) may be formed in the conductive sheets 58,60 either prior to or after the application of the adhesive primer 110, depending on the material characteristics.

In the embodiment where the curing of the adhesive primer 110 is conducted prior to any subsequent assembly or processing, the coated sheet 58,60 is cured at a temperature between about 150° C. and about 300° C., and more specifically, at a temperature of about 260° C. The coated plate body 58,60 is cured for about 10 minutes to about 30 minutes, and more specifically, for about 15 minutes.

In the alternate preferred embodiment, the first conductive sheet 58 is overlaid with an adhesive primer 110 that is partially cured and then assembled with adhesive 112 disposed between it and another opposite conductive sheet 60 also having partially cured adhesive primer 110. Then, the assembled conductive sheets 58,60 having adhesive primer 110 contacting the adhesive polymer 112 are finally cured. In such "two-stage" curing process, a two-stage polymeric resin is selected that is both compatible with and adheres to the conductive sheet 58,60 materials and the adhesive polymer 112. Such two-stage curing resins are well known in the art, and are added to the adhesive primer 110 composition to form part of the binder. Thus, the adhesive primer coating 110 can be cured to a "Stage A" level (i.e., partially cured) by applying heat at relatively low temperatures, to lend strength to the coating 110 for handling and processing. Such curing temperatures are typically between about 70° to 110° C. The partially cured adhesive primer coating 110 may then be subsequently be joined together with the adhesive. The conductive sheet surface 90,92 overlaid with adhesive primer 110 is placed in the appropriate position, where the adhesive 112 will be applied. The adhesive primer 110 and the adhesive 112 can be coupled together. In certain preferred embodiments, low heat application (i.e. 60–90° C.) can be used to facilitate the merging of the adhesive primer 110 with the adhesive 112.

After contacting the adhesive primer 110 with the adhesive 112 in the appropriate pre-selected contact regions 100, heat, and optionally pressure are applied, to cure the binder resin in the adhesive primer 110 matrix to a "Stage B" level (i.e. fully cured). It is preferable that the amount of adhesive primer 110 binder resin is enough to effectuate a strong interface between both the surface 90,92 of the conductive sheet 58,60 and the adhesive 112. Preferred temperature ranges for the second Stage B level cure are from about from about 100° C. to about 300° C. Thus, in a two-stage process, it is possible that the adhesive 112 can be completely cured when the second stage of higher temperature is applied, or may be only partially cured within the temperature range of the second stage, thus maintaining a desirable glass transition temperature. Such curing is dependent on the actual polymers selected, as recognized by one of skill in the art, and may vary based on the individual characteristics of the curing system and these polymers. It is further contemplated that in an alternate embodiment, both the adhesive polymer 112 and the adhesive primer 110 have a two-stage curing resin added, such that both are cured in a two-stage process.

In accordance with the present invention, an adhesive 112 is applied between the first conductive sheet overlaid with an adhesive primer coating 110 and a second conductive sheet also overlaid with an adhesive primer coating 110. The adhesive 112 according to the present invention is electrically conductive and has a tackiness or adhesiveness that facilitates the coherence of the first sheet to the second sheet within the fuel cell. A preferred adhesive 112 according to the present invention is a polymer matrix comprising an adhesive polymer 112 and a plurality of electrically conductive particles distributed therein. Electrically-conductive adhesives, are known in the art and are commercially available. Thus, the adhesive polymer 112 must be selected such that it is capable of withstanding the high electrical potentials and exposure to coolant flowing within the coolant flow channels that will be formed by the coupling of the first sheet to the second sheet.

The adhesive 112, like the sheets themselves, is substantially insoluble in the coolant flowing between the sheets 58 and 60 in that the conductive particles therein will not dissolve and contribute metallic ions to the coolant which causes the otherwise substantially dielectric (i.e., resistivity greater than about 200,000 Ohm-cm) coolant to become inordinately conductive. If the coolant becomes conductive, stray currents flow through the stack via the coolant and short circuiting, galvanic corrosion and coolant electrolysis can occur. Conductive particles are considered to be substantially insoluble if their solubility in the coolant, over time, does not cause the coolant's resistivity to drop below about 200,000 Ohm-cm. Hence when water is used as the coolant metals such as copper, aluminum, tin, zinc and lead are to be avoided, or completely encapsulated in the adhesive 112 resin. In certain preferred embodiments, the adhesive 112 will be highly resistant to hydrogen and mild acids (HF at pH of between 3 to 4), and inert to (i.e., release no ions) to solvents such as deionized water, ethylene glycol and methanol at 100° C. Thus, the selection of the conductive particles and the adhesive polymer 112 is dependent on the compatibility with the coolant used within the fuel cell.

In accordance with a preferred embodiment of the present invention the conductive adhesive 112 comprises about 5% to about 30% percent by weight of conductive filler particles having a particle size varying between about 10 microns to about 50 microns. The electrically conductive particles are selected from the group consisting of: nobel metals including, gold, platinum, palladium, silver, as well as, nickel, tin, graphite, carbon black, and mixtures thereof. It is preferred that the electrical contact resistance of the adhesive 112 is maintained below about 20 mΩ-cm², while minimizing the actual quantity of particles to maximize the adhesiveness of the composition. Thus, preferred adhesive matrix 112 compositions have from between about 5% to about 15% by weight conductive particles in the matrix. Graphite of carbon black conductive filler particles in an adhesive polymer matrix 112, are preferred over the more expensive nobel metal particles.

Preferred adhesive polymers 112 according to the present invention are selected from the group consisting of: elastomers, pressure sensitive adhesives, thermoset adhesives, and mixtures thereof. As previously discussed, preferred adhesive polymers 112 according to the present invention have the requisite tackiness to adhere and couple the first and second conductive sheets to one another. Adhesive polymers 112 may include high glass transition temperature adhesive resins, such as polyamide imide, epoxy, phenolics, and acrylates.

Particularly preferred polymer adhesives 112 according to the present invention are low glass transition temperature ($T_g$), having a $T_g$ of less than about −20° C. It has been found that the compatibility of the adhesive primer 110 with the low glass transition temperature polymers provides a strong bond through the contact region 100, and further provides flexibility during thermal cycling with contraction and expansion of the connected materials. Such bondline durability translates to bond that endures many hours of fuel cell operation and temperature fluctuations, without degrading or increasing contact resistance to an impermissible level. The use of a low glass transition temperature adhesive 112 according to the present invention prolongs the longevity of the fuel cell system, and maintains operational efficiency. Suitable low glass transition temperatures for the present invention include adhesive polymers 112 selected from the group consisting of: ethylene, propylene, butylene, ethylene propylene dimer (EPDM), ethylene propylene monomer (EPM), polyethylene, polypropylene, polybutylene, isobutylene, acrylonitrile butadiene styrene, styrene butadiene rubber, butadiene rubber, nitride rubber, epoxy, urethane, acrylics, silicones, phenolics, novolacs, polymethyl methacrylates, and mixtures thereof.

The conductive adhesive 112 may be brushed, dabbed, sprayed, screen printed, silk screened or rolled onto the surface of the sheets coated with an adhesive primer 110, but it is preferred that the adhesive 112 application is confined to sites 100 where contact between the sheets is to occur. In certain preferred embodiments, the adhesive 112 may be applied to both the first contact surface of the first sheet and to the second contact surface of the second sheet. In alternate embodiment, the adhesive 112 may be applied to only one surface 90 or 92 of either of the sheets 58,60. In preferred embodiments, a mask is first applied over the coated sheets 58,60. The mask has openings therein which are situated over the contact regions 100, or sites where gluing or adherence is to occur. The adhesive 112 is then applied through the openings in the mask. The conductive adhesive 112 is applied to a thickness of about 0.001 to about 0.002 inches. The sheets 58,60 are sandwiched together in a suitable fixture that applies uniform pressure across the sheets 58,60. In certain embodiments, the adhesive 112 may be a pressure sensitive adhesive 112 which sufficiently adheres to the adhesive primer 110 by pressure application along the contact area. In other embodiments, the adhesive polymer 112 may be partially or fully cured. According to the certain preferred embodiments of the present invention, the adhesive 112 is partially of fully cured to impart a structural cohesiveness to the adhesive 112 itself. The partial or full curing will prevent the adhesive 112 from being eroded or washed away by the coolant circulating in the coolant flow channels 93. Thus, in embodiments where curing of the adhesive polymer 112 is required, the sandwiched sheets 58,60 are heated in a hot press with pressure application to cure the polymer matrix material (this may also coincide with the second stage of curing of the adhesive primer 110) and form the assembly. The precise curing temperature and time will vary depending on the chemical composition of the adhesive polymer matrix 112 material.

The present invention will be further explained by way of examples. It is to be appreciated that the present invention is not limited by the examples.

EXAMPLE 1

Two cathodically cleaned titanium metal sheets are coated with an electrically conductive adhesive primer coating prepared by milling the following components for two hours: expanded graphite, EGI5 produced by SGL Polycarbon Inc. of Valencia, Calif. (having graphite particles 90% of which are less than 70 microns) at 6.7% by weight, together with acetylene carbon black (manufactured by insert company name as Cabot Corp. XC72R) at 3.3% by weight, at a ratio of 2:1, in 90% by weight polyamide imide resin which is commercially available from Toyobo of Japan. The resulting coating comprises less than 10% by weight, total carbon. The adhesive primer is sprayed onto the Ti sheet by spraying and was cured at 260° C. for 15 minutes.

An electrically conductive adhesive polymer matrix is prepared by mixing the following components in a mixer for 60 minutes: 95 volume % of a high glass transition temperature epoxy polymer resin, commercially available as Acheson EB-011A/EB-011B (2-part); expanded graphite at 5 volume % commercially available as EG-15; and acetone as a solvent for spray casting at 20 volume %. The adhesive polymer is sprayed over the adhesive primer coating on the first sheet. The first sheet having an adhesive primer overlaid with adhesive polymer is contacted with the second sheet having adhesive primer coating applied. The assembly is heated in an oven to 100° C. for 1 hour to cure the adhesive polymer.

EXAMPLE 2

Two cathodically cleaned 316L stainless steel metal sheets are coated with an electrically conductive primer adhesive coating prepared the same as the adhesive primer coating described in Example 1. The adhesive primer is sprayed onto the 316L sheet by spraying and was cured at 260° C. for 15 minutes.

An electrically conductive adhesive polymer matrix is prepared the same as Example 1. The adhesive polymer is sprayed over the adhesive primer coating on the first sheet. The first sheet having an adhesive primer overlaid with adhesive polymer is contacted with the second sheet having adhesive primer coating applied. The assembly is heated in an oven to 100° C. for 1 hour to cure the adhesive polymer.

EXAMPLE 3

Two cathodically cleaned 316L metal sheets are coated with an electrically conductive primer adhesive coating prepared the same as the adhesive primer coating described in Example 1. The adhesive primer is sprayed onto the 316L stainless steel sheet by spraying and was cured at [260° C.] for 15 minutes.

An electrically conductive adhesive polymer matrix is prepared by mixing the following components in a mixer for 120 minutes: 95 volume % a low glass transition temperature epoxy polymer resin, commercially available as Vantico Araldite CV 5749 (40 C Tg). Expanded graphite at 5 volume % commercially available as EG-15; and acetone as a solvent for spray casting at 20 volume %. The adhesive polymer is sprayed over the adhesive primer coating on the first sheet. The first sheet having an adhesive primer overlaid with adhesive polymer is contacted with the second sheet having adhesive primer coating applied. The assembly is heated in an oven to 100° C. for 15 minutes to partially cure the adhesive polymer.

Samples prepared in accordance with the present invention were compared with prior art samples to ascertain the bondline integrity and stability in Table 1 below. To simulate the stress on the adhesive bond joint(s), the samples were tested with no compressive force applied in a water bath at 90° C. for a duration of time. Typical conditions in a fuel cell include a compressive load of 200 p.s.i. (1400 kPa) at 90° C. and 100% relative humidity, thus the compressive force compensates for general "debonding" or adhesive bond degradation at the contact regions 100. The lack of compressive force in simulated conditions provides accelerated debonding conditions and is a predictor for overall long-term bond stability from between 500 hours of operation to 6000 hours of fuel cell operation.

The samples were tested in apparatus as shown in FIG. 6. The bondline resistance measurements of the electrically conductive element assembly comprising conductive sheets that sandwich adhesive between surfaces coated with adhesive primer are measured as shown in FIG. 6. The testing apparatus comprises a carver press 200 with gold coated platens 202 and a first and second electrically conductive activated carbon paper media 204,206 respectively, pressed between a sample 208 and the gold coated platens 202. A surface area of 6.45 $cm^2$ was tested using 1 $A/cm^2$ current which is applied by a direct current supply. The resistance is measured using a four-point method and calculated from measured voltage drops and from known applied currents and sample 208 dimensions. For metallic samples of negligible bulk resistance, the voltage drop is measured across the adhesive bondline on the sample surface 210, 210 (contact resistance plus bulk adhesive resistance). As shown in FIG. 6, the sample 208 preferably comprises the electrically conductive element (e.g. bipolar plate) having two sheets 210 coupled together. Bondline resistance measurements were measured as potential across the bondline in millivolts (mV) with incremental force applied at the following pressures: 25 psi (170 kPa), 100 p.s.i. (670 kPa), 200 p.s.i. (1400 kPa).

It should be noted that the contact resistance of the conductive carbon paper 204,206 is generally a known value, which can be subtracted from the measurement to establish the contact resistance of the metal plate 210 only. During testing of the samples, a 1 mm thick Toray carbon paper (commercially available from Toray as TGP-H-0.1T) was used for the first and second carbon paper media 204,206. However, in many circumstances the contact resistance of the conductive paper 204,206 is negligible and adds such a small incremental value to the contact resistance value, that it need not be subtracted. The values referred to herein are the bulk contact resistance across the sample 208. In TABLE 1, Sample 1 is an electrically conductive element prepared according to the present invention as described in Example 1. Control 1 is a bipolar plate glued together by a conventional means, namely by using only the adhesive composition disclosed in Example 1, with no adhesive primer attached to either surface of the plates. As can be observed, Control 1 initially had permissible resistance measurements at 3.2 mV (millivolts), however after only 1 day of soaking in a 90° C. water bath reached impermissibly high resistance levels measuring from 69 mV to 96 mV through the range of applied pressure, respectively from 200 p.s.i. to 25 p.s.i. Further measurements after 8 days of soaking showed very high resistances across the bondline, likely due to the failure and degradation of the bond (i.e., 109 to 258 mV from 200 p.s.i. to 25 p.s.i.). In contrast, Sample 1 was tested throughout a period of 8 days, where it demonstrated more stable resistance measurements, with the maximum measurement of 15.5 mV, which exceeds the target bondline resistance (less than 5 mohm cm2), but is expected to meet the target under more realistic fuel cell conditions (i.e., at compression loads of 200 to 400 psi). Further, it should be noted, that resistance measurements tend to be independent of pressure application when the bond is stable and intact. When the debonding, or degradation of the adhesive bond, starts to occur, the resistance becomes a function of the pressure applied, where the resistance measurements decrease with increasing pressure.

TABLE 1

| | Applied Pressure | Initial Measurement (mV) | 1 Day $H_2O$ Soak (mV) | 8 Day $H_2O$ Soak (mV) |
|---|---|---|---|---|
| SAMPLE 1 | 25 p.s.i. (170 kPa) | 4.0 | 8.5 | 15.5 |
| | 100 p.s.i. (670 kPa) | 4.0 | 8.5 | 15.5 |
| | 200 p.s.i (1400 kPa) | 4.0 | 8.5 | 15.5 |
| CONTROL 1 | 25 p.s.i (170 kPa) | 3.3 | 96 | 258 |
| | 100 p.s.i. (670 kPa) | 3.3 | 78 | 128 |
| | 200 p.s.i. (1400 kPa) | 3.3 | 69 | 109 |

An electrically conductive element for use in a fuel cell prepared according to the various embodiments of the present invention demonstrates an improved bond having greater adhesion and long term durability in a fuel cell environment. Moreover, the electrically conductive fluid distribution plate according to the present invention provides low long-term contact resistance across the regions of contact along the bond increasing the operational efficiency of the fuel cell stack and further permits the use of low compression pressures to increase fuel cell stack life.

Overheating of the MEA coolant is prevented or its occurrence at least reduced, since the thermal conductivity of the bond is directly related to the electrical conductivity of the bond. By the invention, stack power loss resulting from excessive electrical voltage drop across the bond is ameliorated. Stack voltage loss due to bondline resistance is less than 10% of the power generated by the stack, desirably 5% or less, and preferably on the order of 1% or less. In addition, degradation of the bondline is prevented.

While the invention has been described in the terms of specific embodiments thereof, it is not intended to be limited thereto but rather only to the extent set forth hereafter in the claims which follow. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A conductive element for a fuel cell comprising;
   a first conductive sheet having a first surface that confronts a second surface of a second conductive sheet;
   wherein said first and said second surfaces are overlaid with an electrically conductive primer coating providing corrosion protection;
   wherein said first and said second coated surfaces are joined to one another at one or more contact regions by an electrically conductive adhesive which together with said primer provides a target bondline resistance across said first and said second sheets respectively which is lower than a comparative contact resistance of said adhesive without said primer, said electrically conductive adhesive having a glass transition temperature less than −20° C.; and said target bondline resistance is maintained for a time duration greater than a time duration during which said comparative contact resistance is maintained.

2. The conductive element according to claim 1, wherein said target bondline resistance is measured across said first and second sheets through said adhesive and said primer and is less than 20 mOhms-cm$^2$ after exposure to fuel cell operating conditions in excess of 500 hours.

3. The conductive element according to claim 1, wherein said target bondline resistance is measured across said first and second sheets through said adhesive and said primer and is less than 5 mOhms-cm$^2$ after exposure to fuel cell operating conditions in excess of 6000 hours.

4. The conductive element according to claim 1, wherein said first and said second conductive sheets comprise an electrically conductive metal.

5. The conductive element according to claim 1, wherein said first and said second conductive sheet comprise an electrically conductive polymeric composite.

6. The conductive element according to claim 1, wherein said electrically conductive primer coating has a contact resistance of less than or equal to about 20 mOhms-cm$^2$ under a compressive force of about 1400 kPa.

7. The conductive element according to claim 1, wherein said primer coating comprises a matrix of a binder and a plurality of electrically conductive particles.

8. The conductive element according to claim 7, wherein said binder is a polymeric resin and is selected from the group consisting of: polyamide imide, polyimide, poly vinyl ester, and mixtures thereof.

9. The conductive element according to claim 1, wherein said primer coating is cured.

10. The conductive element according to claim 7, wherein said electrically conductive particles of said primer coating are selected from the group consisting of: gold, platinum, nickel, tin, silver, palladium, noble metals, graphite, carbon black, and mixtures thereof.

11. The conductive element according to claim 10, wherein said electrically conductive particles comprise graphite and carbon black.

12. The conductive element according to claim 11, wherein said graphite is selected from the group consisting of: expanded graphite, graphite powder, graphite flakes, and mixtures thereof.

13. The conductive element according to claim 11 above, wherein said total amount of graphite and carbon combined are present in said matrix at less than about 10% by weight.

14. The conductive element according to claim 1, wherein said electrically conductive adhesive is partially cured.

15. The conductive element according to claim 1, wherein said electrically conductive adhesive comprises an adhesive polymer and a plurality of electrically conductive particles.

16. The conductive element according to claim 15, wherein said adhesive polymer comprises polyamide imide.

17. The conductive element according to claim 15, wherein said adhesive polymer is selected from the group consisting of: elastomers, pressure sensitive adhesives, thermoset adhesives, and mixtures thereof.

18. The conductive element according to claim 15, above, wherein said adhesive polymer is selected from the group consisting of: ethylene, propylene, butylene, ethylene propylene dimer (EPDM), ethylene propylene monomer (EPM), polyethylene, polypropylene, polybutylene, isobutylene, acrylonitrile butadiene styrene, styrene butadiene rubber, butadiene rubber, nitride rubber, epoxy, urethane, acrylics, silcones, phenolics, novolacs, polymethyl methacrylates, and mixtures thereof.

19. The conductive element according to claim 15, wherein said electrically conductive particles of said electrically conductive adhesive are selected from the group consisting of: gold, platinum, nickel, tin, silver, palladium, noble metals, graphite, carbon black, and mixtures thereof.

20. The conductive element according to claim 1 wherein said first and said second coated surfaces are joined to one another at said one or more contact regions by an electrically conductive adhesive which forms a fluid-tight seal.

21. An electrically conductive contact element comprising:
a first sheet having a first contact surface overlaid with an electrically conductive adhesive primer coating;
a second sheet having a second contact surface overlaid with said electrically conductive adhesive primer coating;
an electrically conductive adhesive disposed between said first contact surface and said second contact surface in electrical contact regions, said electrically conductive adhesive having a glass transition temperature less than −20° C.; and
wherein said electrically conductive adhesive primer coating comprises graphite, carbon black, and a polymeric binder and said total amount of graphite and carbon combined are present in said matrix at less than about ten percent by weight.

22. A fuel cell stack comprising a plurality of fuel cells and an electrically conductive element sandwiched between an anode and cathode of adjacent fuel cells comprising:
a first electrically conductive sheet having an anode confronting surface and a first heat exchange surface;
a second electrically conductive sheet having a cathode confronting surface and a second heat exchange surface;
wherein said first and second heat exchange surfaces are coated with a primer coating comprising a first plurality of electrically conductive particles dispersed in a corrosion resistant polymer; said first and second heat exchange surfaces confronting each other so as to define therebetween a coolant flow passage adapted to receive a liquid coolant and being electrically coupled to one another at a plurality of sites via an electrically conductive adhesive, said electrically conductive adhesive having a glass transition temperature less than −20° C., said electrically conductive adhesive comprising a second plurality of conductive particles dispersed in a polymer having adhesive properties; and
wherein said primer coating and said electrically conductive adhesive together define an electrically conductive path between said first and second sheets.

23. A fuel cell stack of claim 22 wherein an electrical resistance across said electrically conductive path is sufficiently low such that current generated by the anode and cathode is conducted therefrom at a rate sufficient to prevent overheating of said coolant.

24. The fuel cell stack of claim 23 wherein an electrical resistance across said electrically conductive path is sufficiently low such that stack voltage loss due to bondline resistance is less than 5% of the power generated by the stack.

25. The fuel cell stack according to claim 22, wherein said primer coating has a contact resistance of less than 20 mOhms-cm$^2$ at 200 psi.

26. The fuel cell stack according to claim 22, wherein said adhesive and said primer coating together form a fluid-tight seal.

27. A method of increasing bond durability of an electrically conductive element in a fuel cell, the method comprising:
coating a first surface of a first sheet and a second surface of a second sheet with an electrically conductive adhesive primer;
disposing an electrically conductive adhesive having a glass transition temperature less than −20° C. between said first and second coated surfaces; thereby joining said first and said second coated surfaces together; wherein said adhesive is selected for sustained sealing engagement with the adhesive primer applied on said first and said second surfaces.

28. The method according to claim 27, wherein said adhesive is disposed in a quantity sufficient to provide a fluid-tight seal between said first and second surfaces.

29. The method according to claim 27, wherein after said joining said adhesive is cured.

30. The method according to claim 27, wherein after said joining said adhesive is partially cured.

31. The method according to claim 27, wherein prior to said disposing said adhesive primer is cured.

32. The method according to claim 27, wherein said coating is conducted by brushing, spraying, spreading, laminating, screen printing, or powder coating.

33. The method according to claim 27, wherein said disposing is achieved by coating said first surface.

34. The method according to claim 27, wherein said disposing is achieved by coating said first and said second surfaces.

35. The method according to claim 27 above, wherein said disposing is conducted by brushing, dabbing, spraying, or rolling said adhesive on either of said first surface or said second surface, or both of said surfaces.

36. The method according to claim 27, wherein said joining is conducted by applying pressure to said first and second coated surfaces, having said adhesive disposed therebetween.

* * * * *

UNITED STATES PATENT AND TRADEMARK OFFICE
CERTIFICATE OF CORRECTION

PATENT NO. : 6,942,941 B2
DATED : September 13, 2005
INVENTOR(S) : Richard H. Blunk et al.

It is certified that error appears in the above-identified patent and that said Letters Patent is hereby corrected as shown below:

<u>Title page, Item [54] and Column 1, line 1,</u>
Title, should read -- ADHESIVE BONDS FOR METALLIC BIPOLAR PLATES --.

Signed and Sealed this

Twenty-seventh Day of December, 2005

JON W. DUDAS
*Director of the United States Patent and Trademark Office*